United States Patent [19]

Al-Deen et al.

[11] Patent Number: 5,197,574
[45] Date of Patent: Mar. 30, 1993

[54] OIL SYSTEM FOR A BRAKE DISK

[75] Inventors: Hissam Al-Deen, Heidelberg; Martin Hofer, Mannheim; Jürgen Gärther, Worms, all of Fed. Rep. of Germany

[73] Assignee: Deere & Company, Moline, Ill.

[21] Appl. No.: 722,623

[22] Filed: Jun. 27, 1991

[30] Foreign Application Priority Data

Jul. 3, 1990 [DE] Fed. Rep. of Germany ....... 4021188

[51] Int. Cl.$^5$ .............................................. F16D 65/78
[52] U.S. Cl. ................................ 188/71.6; 188/264 D
[58] Field of Search ........ 188/264 CC, 264 D, 264 E, 188/264 F, 71.6, 71.1; 192/70.12, 113 B

[56] References Cited

U.S. PATENT DOCUMENTS

| | | | |
|---|---|---|---|
| 3,366,210 | 1/1968 | Webster | 188/264 E |
| 4,113,067 | 9/1978 | Coons et al. | 188/264 E X |
| 4,173,269 | 11/1979 | Craig | 188/264 E X |
| 5,050,710 | 9/1991 | Bargfrede | 188/264 E X |

FOREIGN PATENT DOCUMENTS 0128758 7/1984 European Pat. Off. .
2059525 4/1981 United Kingdom .

*Primary Examiner*—Matthew C. Graham
*Assistant Examiner*—Lee W. Young

[57] ABSTRACT

An oil system is provided for a brake disk whose brake linings are provided with generally radial grooves through which oil flows from the radially inner portion of the disk to the radially outer portion of the disk. An oil collection channel is located radially outside of the brake linings and collects oil expelled from the brake linings for return through at least one return passage to the oil supply. The return passage is small enough to throttle the flow of oil when the brake is operating at high rotational speeds, but large enough to allow unhampered oil flow at low rotational speeds. This produces a back pressure in the oil collection channel at high rotational speeds, and to a lesser extent, in the grooves in the brake lining. This, in turn, improves lubrication of the brake linings at high speeds.

14 Claims, 3 Drawing Sheets

OIL SYSTEM FOR A BRAKE DISK

BACKGROUND OF THE INVENTION

1. Field of the Invention

The invention relates to an oil system for a brake disk having brake linings with generally radially oriented grooves for carrying oil from the inside to the outside of the disk, and which have at least one radially outer oil collection channel from which the oil returns through at least one return passage.

2. Description of the Related Art

Many wet brakes have brake linings with generally radially oriented grooves to carry oil from the radially inner portion of the liner to the radially outer portion of the liner. The brake linings also are often provided with through passages to allow the oil level on both sides of the disk to equalize.

Oil is provided in the brake housing, and the brake disk is usually partially submerged in the oil so that the radially inner openings of the grooves are submerged in the oil bath. The oil flows radially out along the grooves to the outside of the disk due to the centrifugal forces resulting from rotation of the brake disk. Some oil flows out of the grooves of the brake lining to coat the contact surfaces of the brake to lubricate and cool it, which in turn heats the oil.

The oil collects in a radially outer collection channel, and flows from there through return passages to the brake housing sump. Alternatively, the oil may pass through an oil reservoir or oil cooler before returning to the brake housing sump. Once in the brake housing, the warm oil mixes with the remaining oil, cools, and is again picked up by the rotating grooves, so that a cooling oil circuit is established.

The oil flowing out of the grooves of the brake disk loses its pressure in the oil collection channel, and flows unpressurized through the return passages. The return passages therefore normally have a relatively large cross-sectional area to ensure an unhampered flow of oil from the collection channel. For example, the return passages in the service brake of an agricultural tractor may include three equally spaced radial holes with diameters of about 6 mm.

It has been found that such an oil system does not always assure optimum lubrication and cooling for the brake, particularly when the brake disk is operating at high rotational speeds.

Above a certain critical rotational speed (which varies from brake to brake), the velocity of the oil flow in the grooves becomes so great that a greater quantity of oil is ejected than can be supplied. The oil flow at the ends of the grooves breaks down and air or an air/oil mixture is ingested, creating foam. In addition, air is entrained in the oil in the vicinity of the brake disk due to its high rotational speed. The air entrainment is reinforced if the brake disk is provided with the usual through passages to allow the oil the oil level to equalize on both sides of the brake disk.

The amount of air entrained in the oil or carried along as an air/oil foam can be so large that it can cause localized dry friction, high temperatures, combustion of the oil and destruction of the contact surfaces or brake lining during the braking process.

SUMMARY OF THE PRESENT INVENTION

The object of the present invention is to provide an oil system for a brake liner that assures reliable lubrication and cooling of the braking surfaces, even at high rotational speeds.

This object is achieved according to the present invention by throttling the oil as it returns from the oil collection channel. This can be accomplished either by sizing of the return passages themselves so that they act as throttling orifices, or by including a separate throttling orifice in the line just before or after the return passages.

Throttling of the return oil flow leads to back pressure on the oil, which increases the pressure in the oil collection channel and, to a lesser extent, in the grooves of the brake disk. This contrasts directly with the prior technique of providing a completely unhampered flow of oil from the collection channel to the sump.

The present invention creates considerably better conditions for the oil supply to the brake disk. Due to the back pressure, the oil does not flow out of the grooves as rapidly. The throttling effect increases with the rate of oil flow per unit of time, that is, with increasing rotational speed of the brake disk.

The throttling orifices preferably are so designed that above the aforementioned critical rotational speed, a distinct throttling effect sets in, retarding the oil flow in the grooves and preventing a sharp drop in the flow of oil. In other words, the oil velocity does not become so large that air is entrained in the channels in the brake disk. By this means, air ingestion, and the problems connected therewith, can be avoided or drastically reduced.

Below the critical rotational speed of the brake disk, the oil supply conditions change only insignificantly compared to a conventional oil supply system. At lower rotational speeds and lower oil flow velocities, the oil quantity delivered by the brake disk is so small that the throttling in the return passage is barely effective.

Preferably, the throttling orifices in the return passages are so designed that a pressure increase occurs in the collection channel. The throttling orifices should be sized to produce a pressure increase of between 0.2 and 1.0 bar when the brake is operated at approximately the maximum operating speed of the brake disk, with brakes warm from normal operation, e.g., corresponding to an oil temperature of about 70° C. Preferably, the throttling orifices are sized to produce pressure increases in the range of 0.3 to 0.6 bar, and most preferably about 0.4 bar. The appropriate pressure increase for any specific brake can be determined by experiment.

In the preferred embodiment of the invention, the return channels connect the oil channel with an oil reservoir located outside the brake housing. The oil heated by the braking process flows through the oil collection channel and the throttle return passage to the oil reservoir, from which it can be pumped through an oil cooler before being returned to the brake housing sump. This allows optimum cooling of the lubricating oil.

According to an alternative embodiment of the invention, the throttled return passages connect the oil collection channel with the brake housing sump. In the sump, the heated oil returned from the collection channel mixes with the remaining oil. Excess oil in the brake housing preferably can overflow into an oil reservoir located outside the brake housing, and a supply line provided to return oil from the oil reservoir to the brake housing when needed.

In some cases, it may be appropriate to provide only a single throttled return passage. If so, preferably this line will branch off from the oil connection channel in its upper region, i.e., the return passage would be located vertically above the rotational axis of the brake disk. This will avoid accumulation of dirt in the inlet region of the return passage, which could lead to clogging of the return passage.

In an alternative embodiment, the return passage is routed through the brake piston. The passage may be a cylindrical bore directed radially, with a diameter of approximately 4 mm and a length of approximately 50 mm.

BRIEF DESCRIPTION OF THE DRAWINGS

Two embodiments of the present invention will be described with reference to the following figures.

DETAILED DESCRIPTION OF THE PREFERRED EMBODIMENTS

Figure 1:
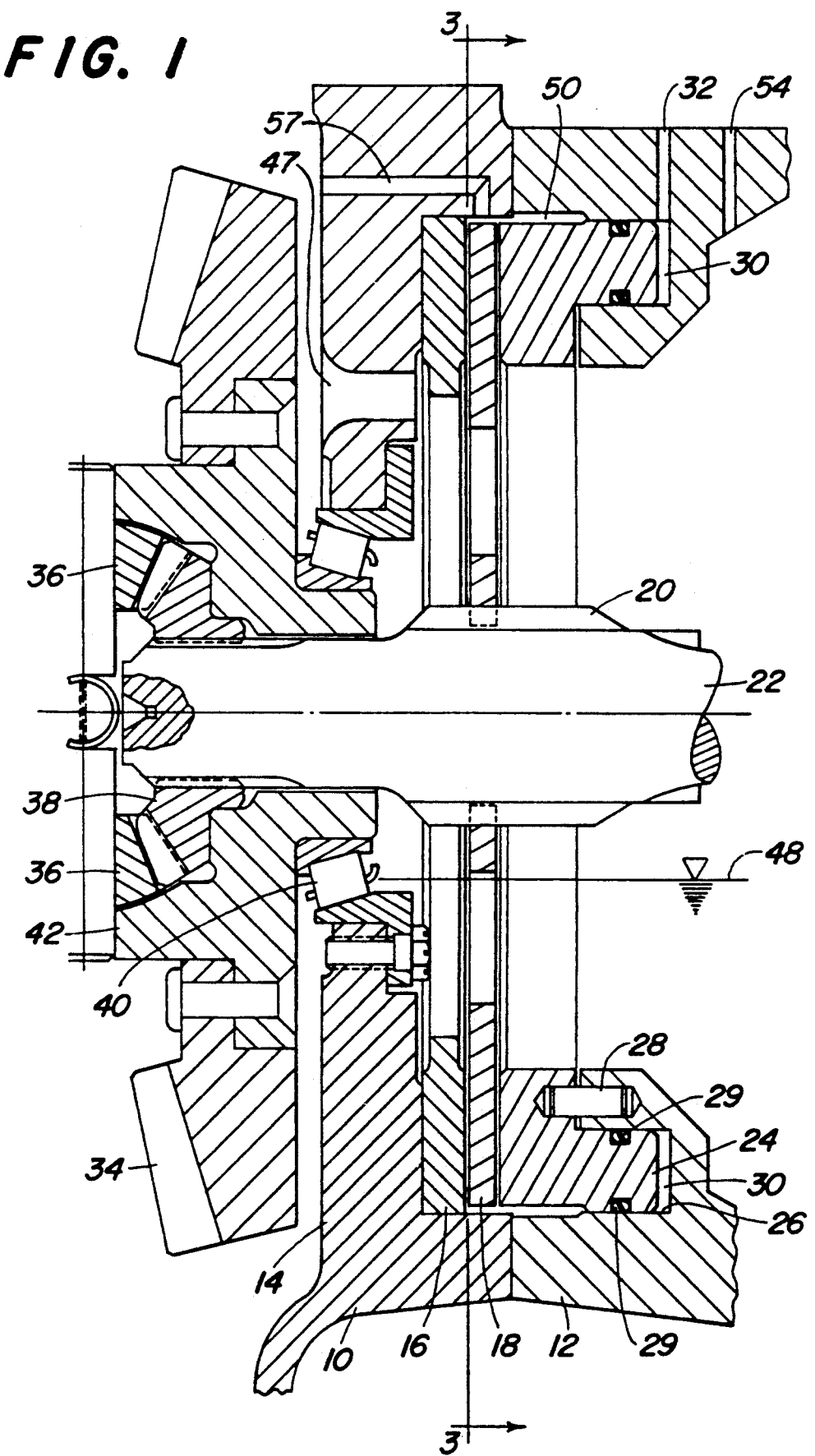
FIG. 1 shows a longitudinal cross-section of a service brake of a vehicle having an oil system according to the present invention.

FIG. 1 depicts part of a gear box housing 10 and a brake housing 12 for a differential gear. Unless specifically noted, in the following, both housings together will be identified as brake housing 12, since together they enclose the service brake.

Intermediate wall 14 separates the differential gear box from the service brake, and provides a seat for the contact disk 16 of the service brake. The contact disk 16 preferably is configured as a fixed brake pad. The contact disk 16 faces the brake disk 18, which is connected by a spline to provide positive locking to a generally horizontal final drive shaft 22 with which it rotates. An annular brake piston 24 is arranged on the side of the brake disk 18 opposite from contact disk 16. The brake piston 24 is guided in an axial annular groove 26 machined in the brake housing 12, and is restrained from rotation by one or more pins 28.

The brake piston 24 and annular groove 26 form a pressure chamber 30 that is closed by seals 29, and that is connected through a channel 32 and a brake line (not shown) to a brake cylinder (not shown). When the brake pedal (not shown) is operated, the brake cylinder fills the pressure chamber 30 with brake fluid and applies pressure thereto. The brake piston 24 thereby is forced against the brake disk 18. This clamps the brake disk 18 between the brake piston 24 and contact disk 16 in such a way that the brake linings of the brake disk 18 are forced against the corresponding braking surfaces of the brake piston 24 and the contact disk 16, braking the final drive shaft 22.

A differential gear located on the other side of the intermediate wall 14 includes a ring gear 34, bevel pinion gears 36, 38 and a differential gear housing 42 supported by a tapered roller bearing 40 on the intermediate wall 14. The bevel pinion 38 is splined to provide a positive lock to drive the final drive shaft 22. A penetration or opening 47 is provided through the intermediate wall 14 above the final drive shaft 22 through which oil can flow to equalize the oil level between the brake housing 12 and gear box housing 10.

Figure 3:
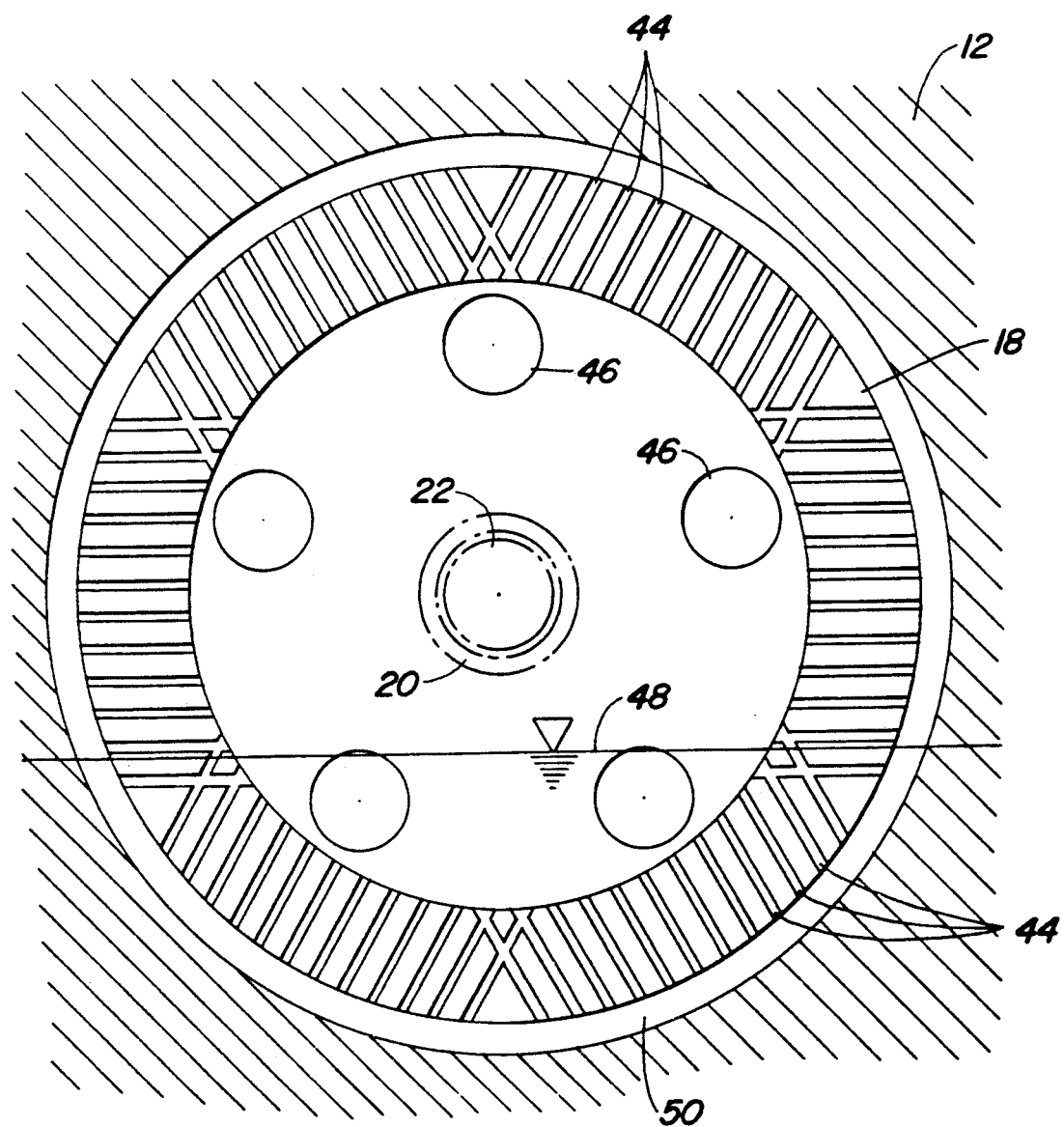
FIG. 3 shows the view along line 3—3 of FIG. 1, illustrating a front view of a brake disk.

Both sides of the brake disk 18 are provided with annular regions that are faced with a brake lining, such as a paper coating. As illustrated in FIG. 3, the brake lining is cut by a multiplicity of grooves 44, distributed around the circumference and generally directed radially. In addition, the brake lining is provided with through holes 46 in a region radially within the brake lining through which oil can pass to allow equalization of the oil level 48 on both sides of the brake disk 18.

As shown in both FIGS. 1 and 3, an oil collection channel 50 is located in the brake housing 12 radially outside the brake disk 18 in a region generally adjacent to the brake piston 24. The oil collection channel 50 is connected through an oil return passage 52 with the interior of the gear box housing 10, so that oil from the oil collection channel 50 can return through the return passage 52 to the gear box housing 10.

For an agricultural tractor, a brake disk 18 with a diameter of approximately 30 cm might be designed for a braking deceleration of approximately 45% of gravitational acceleration with a vehicle weight of approximately 7.5 tons and a maximum rotational speed of the brake disk of approximately 1000 rpm. With a design according to the present invention, the return passage could be provided with a bore of 4 mm diameter and a length of approximately 50 mm.

When the brake is applied, oil flows due to centrifugal force from the oil bath 48 in the brake housing 12 through the grooves 44 on the brake disk 18 radially out into the oil collection channel 50. It then continues through the return passage 52 into the gear box housing 10. The oil flowing out of the brake housing 12 can be replaced by an in-flow, e.g., through passage 54.

At low rotational speeds, the oil flow through the grooves 44 of the brake disk 18 is so low that no significant pressure is built up in the oil collection channel 50 due to the throttling effect of the return passage 52. That is, the oil returns to the gear box housing 10 substantially unhampered.

At high rotational speeds, on the other hand, a considerably greater oil flow is forced through the grooves 44 by centrifugal force. This large amount of oil cannot return through the return passage 52 unhampered, since its cross section is designed to impede large flows of oil. The oil therefore accumulates in the oil collection channel 50 and increases the pressure there. For example, in braking the final drive shaft from a rotational speed of about 1000 rpm, a pressure increase of 0.4 bar can be developed in the oil collection channel in a system sized as suggested above. This pressure increase hinders the free flow of oil out of the grooves 44.

Figure 2:
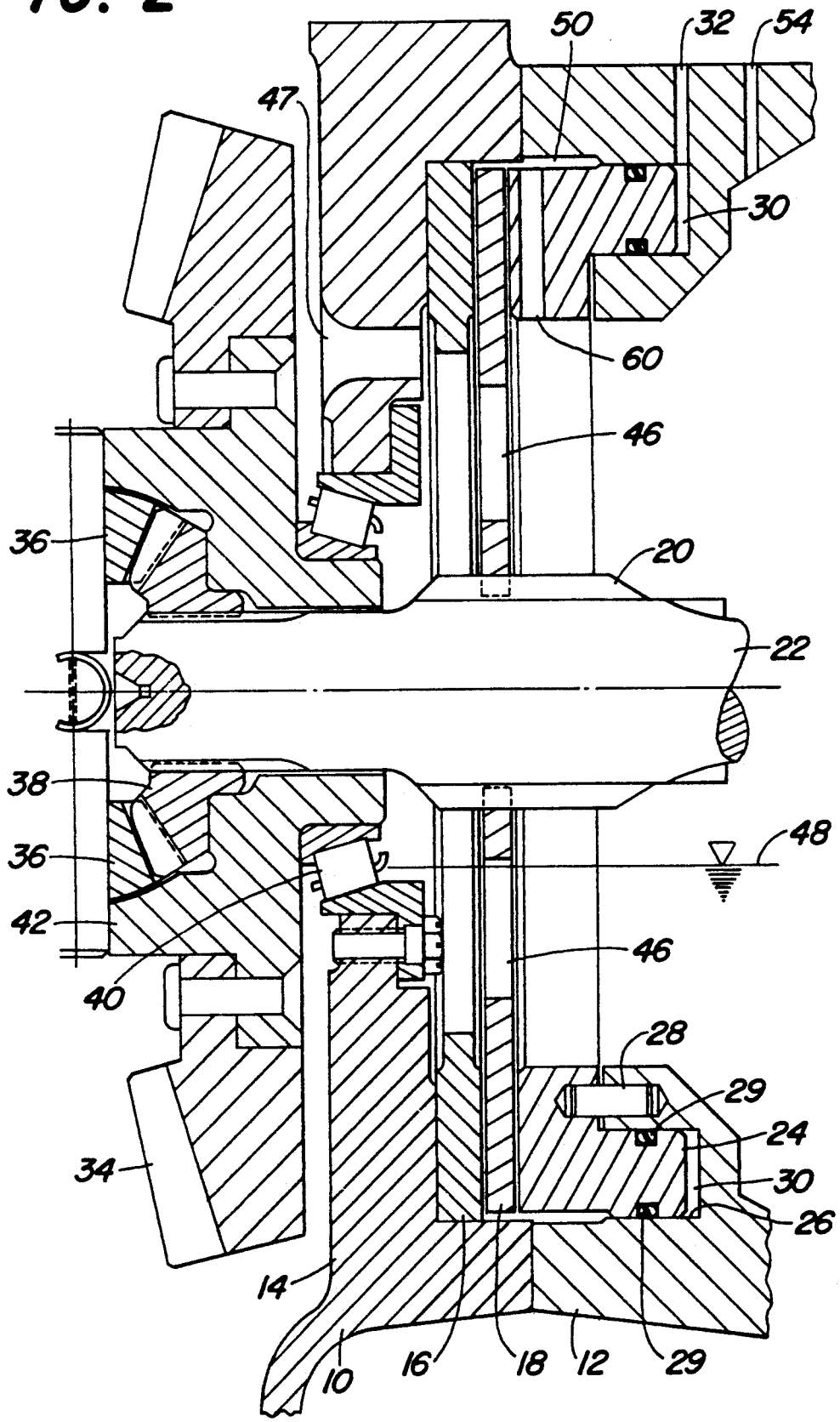
FIG. 2 shows a longitudinal cross-section of a service brake of a vehicle with an alternative embodiment of an oil system according to the present invention.

The service brake shown in FIG. 2 differs from that shown in FIG. 1 in the location of the return passage. Here the return passage 60 is configured as a radial bore in the brake piston 24, and connects the oil collection channel 50 with the interior of the brake housing 12. Here too, the return passage can be figured as a bore with a diameter of about 4 mm. All other components of this embodiment are the same as in the first embodiment, and have been given the same reference numerals.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An oil system for a disk brake, comprising:
   a brake disk having brake linings which are provided with generally radially directed grooves through which oil flows from the radially inner portion of the brake lining to the radially outer portion of the brake lining, said brake disk having a maximum intended rotational operating speed;
   an oil supply for the brake disk providing oil to said grooves;
   at least one oil collection channel located radially out from the brake linings for collecting oil expelled from said grooves; and
   at least one oil return passage through which oil is returned to said oil supply, said return passage being sized to throttle the flow of oil at least when said brake disk is rotating at a high speed less than said maximum intended rotational operating speed.

2. The oil system of claim 1, wherein said return passage is sized to not throttle the flow of oil when said brake disk is rotating at a low speed.

3. The oil system of claim 2, wherein said return passage begins throttling the flow of oil at a rotational speed slightly slower than the speed at which oil on said brake disk would begin to entrain air.

4. The oil system of claim 1, wherein said return passage is sized such that the throttling causes a pressure increase in said oil collection channel.

5. The oil system of claim 4, wherein said return passage is sized to increase the pressure in the oil collection channel by approximately 0.2 to 1.0 bar over the pressure which would be present in the absence of the throttling when the disk brake is operated at said maximum intended rotational operating speed and the oil is at a temperature corresponding to the normal operating temperature.

6. The oil system according to claim 5, wherein said pressure increase is between 0.3 and 0.6 bar.

7. The oil system according to claim 6, wherein said pressure increase is about 0.4 bar.

8. The oil system of claim 1, further comprising an oil reservoir located outside the brake housing and means for connecting said oil reservoir to said oil supply, wherein said at least one return passage connects to said oil reservoir.

9. The oil system according to claim 1, further comprising an oil sump within the housing for said disk brake, and wherein said return passage connects to said oil sump.

10. The oil system according to claim 1, wherein said return passage connects to the upper region of said oil collection channel.

11. The oil system according to claim 1, further comprising a brake piston for activating said brake and wherein said return passage is configured as a generally radial bore through the brake piston.

12. The oil system according to claim 1, wherein said oil collection channel is configured as an annular channel located radially outside the brake disk in the brake housing.

13. The oil system according to claim 12, wherein said oil collection channel extends axially into the region of the housing adjacent to the brake piston which acts upon the brake disk.

14. An oil system for a disk brake, comprising:
   a brake disk having brake linings which are provided with generally radially directed grooves through which oil flows from the radially inner portion of the brake lining to the radially outer portion of the brake lining, said brake disk having a maximum intended rotational operating speed;
   an oil supply for the brake disk providing oil to said grooves;
   at least one oil collection channel located radially out from the brake linings for collecting oil expelled from said grooves; and
   oil return passage means through which oil is returned to said oil supply, for throttling the flow of oil at least when said brake disk is rotating at a high speed less than said maximum intended rotational operating speed.

* * * * *

UNITED STATES PATENT AND TRADEMARK OFFICE
CERTIFICATE OF CORRECTION

PATENT NO. : 5,197,574

DATED : 30 March 1993

INVENTOR(S) : Al-Deen et al.

It is certified that error appears in the above-identified patent and that said Letters Patent is hereby corrected as shown below:

In column 6, line 17, delete "1" and insert -- 11 --.

Signed and Sealed this

Thirtieth Day of November, 1993

Attest:

BRUCE LEHMAN

Attesting Officer

Commissioner of Patents and Trademarks